(12) United States Patent
Sullivan et al.

(10) Patent No.: US 7,534,174 B2
(45) Date of Patent: *May 19, 2009

(54) RUBBER COMPOSITIONS COMPRISING HIGH LEVELS OF OILY SUBSTANCE AND THE USE THEREOF IN GOLF BALLS

(75) Inventors: Michael J. Sullivan, Barrington, RI (US); Derek A. Ladd, Acushnet, MA (US); David A. Bulpett, Boston, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/052,169

(22) Filed: Mar. 20, 2008

(65) Prior Publication Data

US 2008/0167142 A1    Jul. 10, 2008

Related U.S. Application Data

(63) Continuation of application No. 11/685,450, filed on Mar. 13, 2007, now Pat. No. 7,351,165, which is a continuation-in-part of application No. 11/383,838, filed on May 17, 2006, now Pat. No. 7,270,610.

(51) Int. Cl.
*A63B 37/08* (2006.01)
(52) U.S. Cl. .................................... 473/354
(58) Field of Classification Search ................. 473/354, 473/377
See application file for complete search history.

(56) References Cited

U.S. PATENT DOCUMENTS

| | | | |
|---|---|---|---|
| 3,979,126 A | 9/1976 | Dusbiber | |
| 4,321,183 A | 3/1982 | Cox et al. | |
| 4,429,068 A | 1/1984 | Nakahira | |
| 4,530,386 A | 7/1985 | Nakahira | |
| 5,397,129 A | 3/1995 | Kato et al. | |
| 5,542,663 A | 8/1996 | Kato et al. | |
| 5,716,293 A | 2/1998 | Yabuki et al. | |
| 5,776,294 A | 7/1998 | Nagel | |
| 5,849,392 A | 12/1998 | Hamada et al. | |
| 6,194,504 B1 | 2/2001 | Nagel et al. | |
| 6,325,730 B1 * | 12/2001 | Binette et al. | 473/377 |
| 6,371,869 B1 | 4/2002 | Kato et al. | |
| 6,380,291 B1 | 4/2002 | von Hellens | |
| 6,464,600 B2 | 10/2002 | Takemura et al. | |
| 6,503,157 B2 | 1/2003 | Yokota | |
| 6,593,443 B2 | 7/2003 | Iwami | |
| 6,664,319 B1 | 12/2003 | Bahl et al. | |
| 6,669,581 B2 | 12/2003 | Iwami | |
| 6,846,247 B2 * | 1/2005 | Kato | 473/363 |
| 6,849,675 B2 | 2/2005 | Sullivan | |
| 6,855,075 B2 | 2/2005 | Ichikawa et al. | |
| 6,943,213 B2 | 9/2005 | Kuntimaddi | |
| 6,953,404 B2 | 10/2005 | Jordan | |
| 7,091,264 B2 | 8/2006 | Graves et al. | |
| 7,270,610 B1 * | 9/2007 | Sullivan et al. | 473/354 |
| 7,351,165 B2 * | 4/2008 | Sullivan et al. | 473/374 |

OTHER PUBLICATIONS

US Statutory Invention Registration H2036; Assignee Goodyear Tire & Rubber; Inventor, Bush; published Jul. 2, 2002.

* cited by examiner

*Primary Examiner*—Raeann Trimiew
(74) *Attorney, Agent, or Firm*—Mandi B. Milbank

(57) ABSTRACT

The present invention is directed to golf balls having at least one layer formed from a rubber composition comprising a base rubber and from 10 parts to 120 parts of an oily substance, by weight per 100 parts of the base rubber. The base rubber is a polybutadiene having a Mooney viscosity of 40 or greater. The rubber composition may be present in any one or more of a core layer, a cover layer, or an intermediate layer.

9 Claims, No Drawings

RUBBER COMPOSITIONS COMPRISING HIGH LEVELS OF OILY SUBSTANCE AND THE USE THEREOF IN GOLF BALLS

CROSS-REFERENCE TO RELATED APPLICATIONS

This application is a continuation of U.S. patent application Ser, No. 11/685,450, filed on Mar. 13, 2007, now U.S. Pat. No. 7,351,165, which is a continuation-in-part of U.S. patent application Ser. No. 11/383,838, filed on May 17, 2006, now U.S. Pat. No. 7,270,610, the entire disclosures of which are hereby incorporated herein by reference.

FIELD OF THE INVENTION

The present invention is directed to rubber compositions comprising high levels of an oily substance, such as plasticizer and/or process oil, and to the use of such compositions in golf balls.

BACKGROUND OF THE INVENTION

Rubber compositions containing high levels of plasticizer are known. For example, U.S. Pat. No. 4,429,068 to Nakahira discloses a cured rubber having specific physical properties obtained by curing a rubber composition comprising 100 parts by weight of a rubber component, 5 to 2,000 parts of a factice, and 20 to 2,000 parts of a softening agent. The reference states that the rubber composition can be used in golf ball cores.

U.S. Pat. No. 5,776,294 to Nagel discloses a method of providing curable elastomers crosslinked with the aid of metal salts of α,β-ethylenically unsaturated carboxylic acids and, optionally an alkyl aminoalkyl phenol vulcanization inhibitor. Examples are given of metal salts of acrylic and methacrylic acids mixed with ethylene propylene diene rubber and high levels of Sunpar 2280, a proprietary plasticizer available from Sun Refining and Marketing Company, Philadelphia, Pa.

U.S. Pat. No. 6,380,291 to von Hellens discloses rubber compositions comprising an acrylate or methacrylate salt, an elastomer curable with a peroxide initiator, and a plasticizer having one or more epoxide groups per molecule. The reference states that the plasticizer should be present in the rubber composition in an amount of from about 2 to about 20 phr. The reference also states that golf balls are a typical end use.

In the golf ball industry, rubber compositions containing high levels of plasticizer are known to be useful as the inner core layer material in thread wound golf balls. For example, U.S. Pat. Nos. 6,593,443 and 6,669,581 to Iwami and U.S. Pat. No. 6,846,247 to Kato disclose a wound golf ball, wherein the inner core layer is preferably obtained by vulcanizing and molding a rubber composition containing an oily substance, such as a petroleum compounding oil, a plasticizer, a rubber substitute (factice), alkylbenzene, and liquid rubber. The references state that the oily substance is preferably contained in the base rubber in an amount of about 30 to 500 parts, based on 100 parts of the base rubber.

A desire remains for novel rubber compositions containing high levels of an oily substance, which are useful in solid golf ball applications. Such compositions may provide one or more of the following properties relative to previously known golf ball materials: low cost, ease of processing, reduced compression, and reduced velocity. The present invention describes such compositions and their use in a variety of golf ball core, cover, and intermediate layers.

SUMMARY OF THE INVENTION

In one embodiment, the present invention provides a solid golf ball comprising a core and a cover. The core is formed from a rubber composition comprising a base rubber and from 10 parts to 120 parts of an oily substance, by weight per 100 parts of the base rubber. The base rubber is a polybutadiene having a Mooney viscosity of 45 or greater.

In another embodiment, the present invention provides a solid golf ball comprising a core, a polyurethane or polyurea outer cover layer, and an intermediate layer disposed between the core and the outer cover layer. The core is formed from a rubber composition comprising a base rubber and from 10 parts to 120 parts of an oily substance, by weight per 100 parts of the base rubber. The base rubber is a polybutadiene having a Mooney viscosity of 55 or greater. The intermediate layer is formed from a highly resilient material selected from partially- and fully-neutralized acid copolymers and blends thereof.

In yet another embodiment, the present invention provides a solid golf ball comprising a core, a polyurethane or polyurea outer cover layer, and an intermediate layer disposed between the core and the outer cover layer. The core has a diameter of from 0.8 inches to 1.4 inches and is formed from a rubber composition comprising a base rubber and from 30 parts to 120 parts of an oily substance, by weight per 100 parts of the base rubber. The base rubber is a neodymium-catalyzed polybutadiene having a Mooney viscosity of 65 or greater and a cis content of 90% or greater. The intermediate layer has a thickness of 0.1 inches or greater and is formed from a highly resilient material selected from partially- and fully-neutralized acid copolymers and blends thereof.

DETAILED DESCRIPTION OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Golf balls of the present invention are solid golf balls having a variety of core structures, intermediate layers, covers, and coatings. Golf ball cores of the present invention may consist of a single, unitary layer, comprising the entire core from the center of the core to its outer periphery, or they may consist of a center surrounded by at least one outer core layer. Golf ball covers of the present invention may also contain one or more layers, such as a double cover having an inner and outer cover layer. Optionally, additional layers may be disposed between the core and the cover.

Golf balls of the present invention have at least one layer which is formed from a rubber composition of the present invention. The layer comprising the rubber composition may be any one or more layers selected from an inner core layer, an intermediate core layer, an outer core layer, an inner cover layer, an intermediate cover layer, an outer cover layer, or an intermediate layer disposed between a core and a cover. In a particular embodiment, the rubber composition comprises all or part of the core layer of a two-piece golf ball. In another particular embodiment, the rubber composition comprises all or part of the inner core layer and/or outer core layer of a multi-layer golf ball. In yet another embodiment, the rubber composition comprises all or part of the inner cover layer of a multi-layer ball.

Rubber Composition

Rubber compositions of the present invention include a base rubber and a high level of an oily substance. For purposes of the present invention, a composition contains "a high level of an oily substance" if the oily substance is present in the composition in an amount of 2 parts or greater by weight per 100 parts of base rubber. In a particular embodiment, the oily substance is present in the composition in an amount of 2.5 parts or greater, or 5 parts or greater, by weight per 100 parts of base rubber. In another particular embodiment, the oily substance is present in the composition in an amount within the range having a lower limit of 2 parts, or 2.5 parts, or 3 parts, or 5 parts, or 10 parts, by weight per 100 parts of rubber, and an upper limit of 20 parts, or 25 parts, or 30 parts, or 50 parts, or 100 parts, or 200 parts, by weight per 100 parts of rubber. In another particular embodiment, the oily substance is present in the composition in an amount within the range having a lower limit of 10 parts, or 15 parts, or 20 parts, or 25 parts, or 30 parts, or 35 parts, by weight per 100 parts of rubber, and an upper limit of 100 parts, or 120 parts, or 150 parts, or 200 parts, by weight per 100 parts or rubber.

The oily substance is generally selected from rubber processing oils, vegetable oils, vulcanized vegetable oils, animal oils, liquid rubbers, plasticizers, and combinations thereof. Suitable rubber processing oils include, for example, aromatic oils, naphthenic oils, and paraffinic oils, as classified by ASTM D2226. In a particular embodiment, the oily substance is selected from paraffinic oil, naphthenic oil, and combinations thereof. Particularly suitable paraffinic and naphthenic oils include, for example, Sunpar® paraffinic oil, commercially available from Sunoco, Inc. of Philadelphia, Pa.; Paralux® paraffinic oil, commercially available from Chevron Corporation of San Ramon, Calif.; and Unithene naphthenic oil, commercially available from Ergon, Inc. of Jackson, Miss. Particularly suitable oils also include low PCA/ PHA (polycyclic aromatic/polyaromatic hydrocarbon) oils, including mild extraction solvates (MES), treated distillate aromatic extracts (TDAE), and heavy naphthenic oils. Suitable low PCA oils are further disclosed in U.S. Pat. No. 6,977,276 (for example at column 4, line 31 up to and including column 6, line 27), the entire disclosure of which is hereby incorporated herein by reference. Also suitable are the hydrogenated naphthenic oils, including those disclosed in U.S. Pat. No. 6,939,910, the entire disclosure of which is hereby incorporated herein by reference. Suitable vegetable oils include, for example, rapeseed, castor, linseed, soybean, and tung oil. Suitable vulcanized vegetable oils include, for example, semi-translucent factice, black factice, and brown factice; in particular, "F14" and "F17" sulfur vulcanized rapeseed oils, "K14D" sulfur vulcanized modified fatty acids, "Gloria 17" sulfur vulcanized rapeseed oil, "Hamburg 4" partially hydrogenated rapeseed oil, and "WP" peroxide crosslinked modified castor oil free of sulfur and chlorine, all of which are commercially available from RT Vanderbilt Company, Inc. of Norwalk, Conn. Suitable animal oils include, for example, whale oil and fish oil. Suitable liquid rubbers include, for example, liquid polybutadiene and liquid polyisoprene. Suitable plasticizers include, for example, adipates, e.g., dioctyl adipate, diisopropyl adipate, dibutyl adipate, bis(2-ethylhexyl)adipate, polypropylene adipate, diisodecyl adipate, bis(2-methylhexyl)adipate, dicapryl adipate, and octyldecyl adipate; phthalates, e.g., dioctyl phthalate, dibutyl phthalate, nonyl phthalate, butylbenzyl phthalate, diheptyl phthalate, dihexyl phthalate, dinonyl phthalate, ditridecyl phthalate, dicapryl phthalate, dilauryl phthalate, diisodecyl phthalate, dimethylglycol phthalate, butyl octyl phthalate, dicyclohexyl phthalate, butyl cyclohexyl phthalate, butyl lauryl phthalate, butylcoconutalkyl phthalate, octyldecanoyl phthalate, octyldecyl phthalate, bis(2-ethylhexyl)phthalate, bis(3,5,5-trimethylhexyl) phthalate, bis(diethyleneglycolmonomethylether) phthalate, butyl benzyl phthalate, and texanol benyl phthalate; phosphates, e.g., tricresyl phosphate, trimethyl phosphate, triethyl phosphate, isopropylated triphenyl phosphate, tributyl phosphate, trioctyl phosphate, tri-2-ethyl hexyl phosphate, tributoxy phosphate, triphenyl phosphate, trixylenyl phosphate, 2-ethylhexyl diphenyl phosphate, tris(2,6-dimethyl phenyl) phosphate, isodecyl diphenyl phosphate, mixed dodecyl and tetradecyl diphenyl phosphate, butylphenyl diphenyl phosphate, xylenyl diphenyl phosphate, phenyl dicresyl phosphate, xylenyl dicresyl phosphate, cresyl diphenyl phosphate, cresyl dixylenyl phosphate, diphenyl phosphate hydroquinone condensate, trichloroethyl phosphate, tri(β-chloropropyl)phosphate, tri(dichloropropyl)phosphate, and tri(tribromoneopentyl)phosphate; sebacates, e.g., dioctyl sebacate and 2-ethyl hexyl sebacate; alkyl benzenes, e.g., 1-dodecyl-4-hexylbenzene, 1-dodecyl-3-hexylbenzene, and 1,2,3-hemimellitene; citrates, e.g., acetyl tributyl citrate, triethyl citrate, acetyl triethyl citrate, and tributyl citrate; glycolic acid esters, e.g., ethylphthalyl ethylene glycolate, methylphthalyl ethylene glycolate, and butylphthalyl ethylene glycolate; epoxy compounds, e.g., butylepoxy stearate, octylepoxy stearate, epoxybutyl oleate, epoxidized butyl oleate, epoxidized soybean oil, epoxidized linseed oil, epoxidized alkyl oil, and epoxidized alkyl oil alcohol esters; trimellitates, e.g., tri-2-ethyl hexyl trimellitate and tri-octyl trimellitate; fatty acid esters, e.g., butyl oleate; benzoates, e.g., diethylene glycol dibenzoate and dipropylene glycol dibenzoate; azelates; glutarates; alkyl alcohols; and combinations thereof. Suitable plasticizers also include those disclosed in U.S. Patent Application Publication No. 2005/0137030, the entire disclosure of which is hereby incorporated herein by reference.

The base rubber is generally selected from polybutadiene rubber, polyisoprene rubber, natural rubber, ethylene propylene rubber, ethylene propylene diene rubber, styrene-butadiene rubber, and combinations of two or more thereof. A preferred base rubber is one or more polybutadiene(s). Particularly suitable polybutadiene blends are disclosed, for example, in U.S. Pat. No. 6,774,187, the entire disclosure of which is hereby incorporated herein by reference. Another preferred base rubber is one or more polybutadiene(s) optionally mixed with one or more elastomer(s) selected from polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers. When the rubber composition contains an additional elastomer (i.e., in addition to the base rubber), the additional elastomer is present in the rubber composition in an amount of less than 100 parts by weight per 100 parts of the base rubber. In a particular embodiment, the additional elastomer is present in an amount of 50 parts or less, or 45 parts or less, or 20 parts or less, or 5 parts or less, by weight per 100 parts of the base rubber.

Particularly preferred base rubbers in compositions of the present invention are high Mooney polybutadienes. For purposes of the present invention, "high Mooney" refers to polybutadienes having a Mooney viscosity, as measured prior to oil or plasticizer addition, of 40 or greater. Preferably, the high Mooney polybutadiene has a Mooney viscosity, as measured prior to oil or plasticizer addition of 45 or greater, or 50 or greater, or 55 or greater, or 60 or greater, or 65 or greater, or 75 or greater, or 80 or greater.

Preferred high Mooney polybutadienes of the present invention are neodymium-catalyzed, preferably having a cis content of 90% or greater, although low cis (<90%), trans, and vinyl versions are also suitable. Also suitable are titanium-catalyzed, nickel-catalyzed, and cobalt-catalyzed high Mooney polybutadienes, preferably having a cis content of 90% or greater, although low cis (<90%), trans, and vinyl versions are also suitable.

In a particularly preferred embodiment, the rubber composition comprises a solution high cis, high Mooney polybutadiene polymer produced with neodymium catalyst, extended with 37.5 phr MES oil. In a particular aspect of this embodiment, the rubber composition has a Mooney viscosity of 37, measured according to ASTM D1646. In another particular aspect of this embodiment, the polybutadiene has a Mooney viscosity of from 80 to 90, prior to oil addition. In another particular aspect of this embodiment, the rubber composition has a specific gravity of 0.93, measured according to ASTM D 5668. In another particular aspect of this embodiment, the polybutadiene has a cis-1,4 content of 96% by wt, measured using FT-IR Spectroscopy. In another particular aspect of this embodiment, the rubber composition has an oil content of 27.3 wt %, measured according to ASTM D 5774. A particularly suitable high cis neodymium-catalyzed polybutadiene extended with 37.5 phr MES oil is Buna CB 29 MES, commercially available from Lanxess® Corporation. The high cis neodymium-catalyzed polybutadiene is optionally blended with a non-extended rubber including, but not limited to, natural rubber, butyl rubber, styrene-butadiene rubber, isoprene rubber, balata, ethylene-propylene rubber, ethylene-propylene-diene rubber, and combinations thereof.

The base rubber is typically cured using a conventional curing process. Suitable curing processes include, for example, peroxide curing, sulfur curing, radiation, and combinations thereof. In one embodiment, the base rubber is peroxide cured. Organic peroxides suitable as free radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free radical initiators are generally present in the rubber compositions in an amount within the range having a lower limit of 0.05 parts, or 0.1 parts, or 0.25 parts, or 1 part, or 1.5 parts, by weight per 100 parts of the base rubber, and an upper limit of 2.5 parts, or 3 parts, or 5 parts, or 6 parts, or 10 parts, or 15 parts, by weight per 100 parts of the base rubber. Coagents can be used with peroxides to increase the state of cure. Suitable coagents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the coagent is selected from zinc salts of acrylates, diacrylates, methacrylates, and dimethacrylates. In another particular embodiment, the coagent is zinc diacrylate. When the agent is zinc diacrylate and/or zinc dimethacrylate, the coagent is typically included in the rubber composition in an amount within the range having a lower limit of 1 part, or 5 parts, or 10 parts, or 20 parts, by weight per 100 parts of the base rubber, and an upper limit of 25 parts, or 30 parts, or 35 parts, or 40 parts, or 50 parts, or 60 parts, by weight per 100 parts of the base rubber. When one or more less active coagents are used, such as zinc monomethacrylate and various liquid acrylates and methacrylates, the amount of less active coagent used may be the same as or higher than for zinc diacrylate and zinc dimethacrylate coagents.

Sulfur and sulfur-based curing agents with optional accelerators may be used in combination with or in replacement of the peroxide initiators to crosslink the base rubber. Suitable curing agents and accelerators include, for example, sulfur; N-oxydiethylene 2-benzothiazole sulfenamide; N,N-diorthotolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

High energy radiation sources capable of generating free radicals may also be used to crosslink the base rubber. Suitable examples of such radiation sources include, for example, electron beams, ultra-violet radiation, gamma radiation, X-ray radiation, infrared radiation, heat, and combinations thereof.

Further examples of suitable free radical initiators, coagents, and curing agents are disclosed in U.S. Patent Application Publication Nos. 2004/0214661 and 2003/0144087 and U.S. Pat. Nos. 6,566,483, 6,695,718, and 6,939,907, the entire disclosures of which are hereby incorporated by reference.

Rubber compositions of the present invention may also contain a cis-to-trans conversion compound, such as a halogenated organosulfur, organic disulfide, or inorganic disulfide compound. Particularly suitable halogenated organosulfur compounds include, but are not limited to, halogenated thiophenols having the general formula

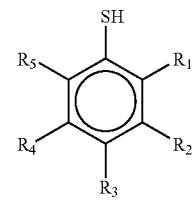

wherein $R_1$-$R_5$ are independently selected from $C_1$-$C_8$ alkyl groups, halogen groups, thiol groups (—SH), carboxylated groups, sulfonated groups, and hydrogen, in any order, and wherein at least one group is halogenated. Suitable examples include, but are not limited to, pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol;

3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; and their salts, preferably their zinc or magnesium salts. Halogenated organosulfur compounds are more fully disclosed, for example, in U.S. Pat. No. 6,635,716, the entire disclosure of which is hereby incorporated herein by reference. In a particular embodiment, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. Pentachlorothiophenol is commercially available, in neat and salt forms, from eChinachem of San Francisco, Calif. In another particular embodiment, the halogenated thiophenol compound is the zinc salt of pentachlorothiophenol, also available from eChinachem of San Francisco, Calif. Suitable cis-to-trans conversion compounds are more fully described, for example, in U.S. Patent Application Publication No. 2005/0187353 and U.S. Pat. Nos. 5,252,652, 5,697,856, 5,816,944, 6,139,447, 6,184,301, 6,465,578, and 6,525,141, the entire disclosures of which are hereby incorporated herein by reference.

When rubber compositions of the present invention contain a cis-to-trans conversion compound, the cis-to-trans conversion compound is generally present in the rubber composition in an amount within the range having a lower limit of 0.01 parts, or 0.05 parts, or 2.2 parts, or 2.3 parts, per 100 parts of the base rubber, and an upper limit of 4 parts, or 5 parts, per 100 parts of the base rubber.

Rubber compositions of the present invention optionally contain one or more antioxidants. Some antioxidants also act as free radical scavengers. Thus, when antioxidants are included in the rubber composition, the amount of free radical initiator used may be as high or higher than the amounts disclosed herein.

Rubber compositions of the present invention optionally contain one or more particulate fillers selected from inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers. The amount of particulate material(s) present in rubber compositions of the present invention is typically within the range having a lower limit of 5 parts, or 10 parts, by weight per 100 parts of the base rubber, and an upper limit of 30 parts, or 50 parts, or 100 parts, by weight per 100 parts of the base rubber.

Rubber compositions of the present invention optionally contain one or more additives selected from free radical scavengers, scorch retarders, coloring agents, fluorescent agents, chemical blowing and foaming agents, defoaming agents, stabilizers, softening agents, impact modifiers, and the like. The amount of additive(s) typically present in rubber compositions of the present invention is typically within the range having a lower limit of 0 parts by weight per 100 parts of the base rubber and an upper limit of 20 parts, or 50 parts, or 100 parts, or 150 parts, by weight per 100 parts of the base rubber.

Filler materials may be dual-functional fillers, for example, zinc oxide (which may be used as a filler/acid scavenger) and titanium dioxide (which may be used as a filler/brightener material). Further examples of suitable fillers and additives include, but are not limited to, those disclosed in U.S. Patent Application Publication No. 2003/0225197, the entire disclosure of which is hereby incorporated herein by reference.

The present invention is not limited by any particular method for making the rubber composition. In a typical mixing process, the rubber composition is formed by combining the materials in a single- or multi-pass procedure using mixing equipment, such as a Banbury mixer, two-roll mill, etc. The oily substance is optionally preblended or masterbatched with a polymer prior to combining it with the base rubber.

Rubber compositions of the present invention can be used in a variety of applications. For example, rubber compositions of the present invention are suitable for use in golf equipment, including, but not limited to, golf balls, golf shoes, and golf clubs.

Golf Ball Applications

Golf balls of the present invention are solid balls having one or more core layer(s), one or more cover layer(s), and optionally one or more intermediate layer(s) disposed between the core and the cover. At least one of the layers is formed from a rubber composition comprising high levels of an oily substance, as described herein. In golf balls having two or more layers which comprise a rubber composition of the present invention, the rubber composition of one layer may be the same or a different rubber composition as another layer.

Golf balls of the present invention preferably have at least one core layer formed from a rubber composition of the present invention. In a particular embodiment, the present invention provides a golf ball having a single layer core formed from a rubber composition of the present invention. In another particular embodiment, the present invention provides a golf ball comprising a dual core having an inner core layer and an outer core layer, wherein the inner core layer is formed from a rubber composition of the present invention. In another particular embodiment, the present invention provides a golf ball comprising a dual core having an inner core layer and an outer core layer, wherein the outer core layer is formed from a rubber composition of the present invention. In another particular embodiment, the present invention provides a golf ball comprising a multilayer core having an inner core layer, an outer core layer, and at least one intermediate core layer, wherein the inner core layer is formed from a rubber composition of the present invention. In another particular embodiment, the present invention provides a golf ball comprising a multilayer core having an inner core layer, an outer core layer, and at least one intermediate core layer, wherein the outer core layer is formed from a rubber composition of the present invention. In another particular embodiment, the present invention provides a golf ball comprising a multilayer core having an inner core layer, an outer core layer, and at least one intermediate core layer, wherein an intermediate core layer is formed from a rubber composition of the present invention.

Golf ball cores of the present invention preferably have an overall diameter within the range having a lower limit of 0.5 inches or 0.8 inches or 1 inch or 1.25 inches or 1.3 inches and an upper limit of 1.35 inches or 1.4 inches or 1.5 inches or 1.56 inches or 1.6 inches or 1.63 inches. Inner core layers of the present invention preferably have a diameter within the range having a lower limit of 0.5 inches or 0.75 inches or 1 inch and an upper limit of 1.25 inches or 1.4 inches or 1.55 inches or 1.57 inches or 1.58 inches. Outer core layers of the present invention preferably have a thickness within the range having a lower limit of 0.01 inches or 0.015 inches or 0.02 inches or 0.025 inches or 0.03 inches and an upper limit of 0.05 inches or 0.1 inches or 0.28 inches or 0.35 inches or 0.4 inches or 0.5 inches or 0.55 inches. The total thickness of intermediate core layer(s) of the present invention is preferably within the range having a lower limit of 0.02 inches or 0.025 inches or 0.032 inches and an upper limit of 0.15 inches or 0.22 inches or 0.28 inches.

Golf ball cores having at least one layer formed from a rubber composition of the present invention may have reduced compression and/or reduced velocity due to the presence of the oily substance. Thus, in golf ball applications requiring high compression and/or high velocity, it may be desirable to include one or more layer(s) formed from a highly resilient material and/or for the cover to have an overall thickness of 0.1 inches or greater. Suitable highly resilient materials include, but are not limited to, the "low deformation" materials disclosed in U.S. Patent Application Publication No. 2005/0250600; thermoplastics with high resilience and softness, such as those disclosed in PCT Publication No. WO 01/29129 and U.S. Pat. No. 6,653,382; highly-resilient thermoplastic elastomer compositions, such as those disclosed in PCT Publication No. WO 00/23519 and U.S. Pat. No. 6,815,480; highly-neutralized ethylene copolymers, such as those disclosed in U.S. Pat. No. 6,777,472; ionomer resins containing high levels of fatty acid salts, such as those disclosed in U.S. Pat. No. 5,306,760; highly-neutralized acid polymers, such as those disclosed in U.S. Pat. No. 6,756,436; Na-ionomer/Li-ionomer blends, such as those disclosed in U.S. Patent Application Publication No. 2005/0255941; sulfonated and/or phosphonated ionomer compositions, such as those disclosed in U.S. Pat. No. 6,245,862; stearic modified ionomers, such as those disclosed in U.S. Pat. No. 6,100,321; blends of relatively hard polyamide and relatively soft ionomer resin, such as those disclosed in U.S. Pat. No. 6,187,864; poly(trimethylene terephthalate) compositions, such as those disclosed in U.S. Pat. No. 6,232,400; glycidyl polymer compositions, such as those disclosed in U.S. Pat. No. 6,290,611; and acrylate ester-containing ionomeric resins, such as those disclosed in U.S. Pat. No. 5,902,855. Each of the above patents and publications is hereby incorporated herein by reference in its entirety. Suitable highly resilient materials also include any hard, high flexural modulus, resilient material that is compatible with the other materials of the golf ball, including, for example, thermoplastic and thermoset polyurethanes, thermoplastic and thermoset polyureas, thermoplastic and thermoset polyetheresters, thermoplastic and thermoset polyetheramides, thermoplastic and thermoset polyesters, dynamically vulcanized elastomers, functionalized styrene-butadiene elastomers, metallocene polymers, nylon, and acrylonitrile-butadiene-styrene copolymers, and combinations of one or more thereof. Also suitable as highly resilient materials are Surlyn® ionomers, Hytrel® thermoplastic polyester elastomers, and ionomeric materials sold under the trade names DuPont® HPF 1000 and DuPont® HPF 2000, all of which are commercially available from E. I. du Pont de Nemours and Company; Iotek® ionomers, commercially available from ExxonMobil Chemical Company; and Pebax® thermoplastic polyether block amides, commercially available from Arkema Inc.

Golf ball cores may include one or more layers formed from a suitable material other than the rubber composition of the present invention. Suitable core materials for the golf balls disclosed herein include, for example, natural and synthetic rubbers, such as polybutadiene, polyisoprene, ethylene propylene rubber, ethylene propylene diene rubber, styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, and acrylonitrile chlorinated isoprene rubber; metallocene polymers; acid copolymers and ionomers; and combinations thereof.

Golf ball covers of the present invention include single, dual, and multilayer covers, and preferably have an overall thickness within the range having a lower limit of 0.01 inches or 0.02 inches or 0.05 inches or 0.06 inches or 0.1 inches or 0.115 inches and an upper limit of 0.15 inches or 0.2 inches or 0.25 inches or 0.5 inches or 0.8 inches or 1.0 inches. Dual and multilayer covers have an inner cover layer and an outer cover layer, and multilayer covers additionally have at least one intermediate cover layer disposed between the inner cover layer and the outer cover layer. Inner cover layers of the present invention preferably have a thickness within the range having a lower limit of 0.005 inches or 0.01 inches or 0.02 inches or 0.025 inches or 0.03 inches and an upper limit of 0.05 inches or 0.1 inches or 0.15 inches or 0.2 inches. Outer cover layers of the present invention preferably have a thickness of 0.01 inches or 0.02 inches or 0.025 inches or 0.03 inches and an upper limit of 0.04 inches or 0.05 inches or 0.15 inches or 0.2 inches. Intermediate cover layer(s) of the present invention preferably have a thickness of 0.01 inches or 0.02 inches or 0.025 inches and an upper limit of 0.05 inches or 0.15 inches or 0.2 inches.

Golf ball covers of the present invention may include one or more layers formed from a suitable material other than a rubber composition of the present invention. The cover material is preferably a tough, cut-resistant material, selected based on the desired performance characteristics. Suitable cover materials for the golf balls disclosed herein include, for example, the highly resilient materials disclosed above; polyethylene, including, for example, low density polyethylene, linear low density polyethylene, and high density polyethylene; polypropylene; rubber-toughened olefin polymers; acid copolymers which do not become part of an ionomeric copolymer; plastomers; flexomers; block copolymers, such as styrene-butadiene rubber and isoprene- or ethylene-butylene rubber; dynamically vulcanized elastomers; ethylene vinyl acetates; ethylene methacrylates; vinyl resins comprising vinyl chloride; acrylic resins; polyamides, amide-ester elastomers, and graft copolymers of ionomer and polyamide, including, for example, Pebax® thermoplastic polyether block amides, commercially available from Arkema Inc; crosslinked transpolyisoprene blends; polyurethanes; polyureas; polyester-based thermoplastic elastomers, such as Hytrel®, commercially available from E. I. du Pont de Nemours and Company; polyurethane-based thermoplastic elastomers, such as Elastollan®, commercially available from BASF; polyphenylene oxide resins, such as Noryl®, commercially available from GE Plastics; synthetic or natural vulcanized rubber; ionomeric resins; and combinations thereof. Suitable cover materials and constructions also include, but are not limited to, those disclosed in U.S. Pat. Nos. 6,117,025, 6,767,940, and 6,960,630, the entire disclosures of which are hereby incorporated herein by reference.

Commercially available ionomeric cover materials include, but are not limited to, Surlyn® ionomer resins and DuPont® HPF 1000 and HPF 2000, commercially available from E. I. du Pont de Nemours and Company; and Iotek® ionomers, commercially available from ExxonMobil Chemical Company. Also suitable are blends of ionomers with thermoplastic elastomers. Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable polyurethane cover materials are further disclosed, for example, in U.S. Pat. No. 6,756,436, the entire disclosure of which is hereby incorporated herein by reference. When used as cover materials, polyurethane and polyurea can be thermoset or thermoplastic. Thermoset materials can be formed into golf ball layers by conventional casting or reaction injection molding techniques. Thermoplastic materials can be formed into golf ball layers by conventional compression or injection molding techniques. Light stable polyurethanes and polyureas are a preferred material for single layer covers and the outer cover layer of dual and multilayer covers. High modulus thermoplastics are a preferred material for the inner cover layer of dual and multilayer covers.

Golf ball cover materials optionally contain one or more filler(s) and/or additive(s). Suitable fillers include, for example, metal oxides, barium sulfate, zinc sulfate, calcium carbonate, zinc carbonate, barium carbonate, mica, talc, clay, silica, lead silicate, and the like. Suitable additives include, for example, coloring agents, fluorescent agents, whitening agents, metals, antioxidants, dispersants, UV absorbers, light stabilizers, plasticizers, surfactants, viscosity modifiers, compatibility agents, foaming agents, reinforcing agents, release agents, and the like.

Golf balls of the present invention optionally include one or more intermediate layer(s) disposed between the core and the cover. When present, the overall thickness of the intermediate layer(s) is generally within the range having a lower limit of 0.01 inches or 0.05 inches or 0.1 inches and an upper limit of 0.3 inches or 0.35 inches or 0.4 inches. In addition to the rubber compositions of the present invention, suitable intermediate layer materials include, for example, natural rubbers, balata, gutta-percha, cis-polybutadienes, trans-polybutadienes, synthetic polyisoprenes, polyoctenamers, styrene-propylene-diene rubbers, metallocene rubbers, styrene-butadiene rubbers, ethylene-propylenes, chloroprene rubbers, acrylonitrile rubbers, acrylonitrile-butadiene rubbers, styrene-ethylene block copolymers, maleic anhydride or succinate modified metallocene catalyzed ethylene copolymers, polypropylene resins, ionomer resins, polyamides, polyesters, polyurethanes, polyureas, chlorinated polyethylenes, polysulfide rubbers, fluorocarbons, and combinations thereof.

Golf balls of the present invention preferably have an overall diameter within the range having a lower limit of 1.6 or 1.62 or 1.66 inches and an upper limit of 1.69 or 1.74 or 1.800 inches. More preferably, golf balls of the present invention have an overall diameter of 1.68 inches. Golf balls of the present invention preferably have a compression of 120 or less, or 110 or less, or 105 or less. Golf balls of the present invention preferably have a COR at 125 ft/s of 0.750 or greater, or 0.780 or greater, or 0.790 or greater, or 0.800 or greater.

Suitable golf ball constructions and materials are further disclosed, for example, in U.S. Patent Application Publication Nos. 2003/0144087, 2005/0164810, and 2005/0255941; U.S. Pat. Nos. 5,688,119, 5,919,100, and 7,004,856; and PCT Publications WO00/23519 and WO00/29129. The entire disclosure of each of these references is hereby incorporated herein by reference.

In a particular embodiment, the present invention is directed to a golf ball comprising a single layer core and a single-, dual-, or multi-layer cover. The core layer is formed from a rubber composition comprising a high level of an oily substance and has a diameter of 1.4 inches or less. Preferably, the core has a diameter within the range having a lower limit of 0.5 inches or 0.8 inches or 1.3 inches and an upper limit of 1.35 inches or 1.4 inches. The core layer preferably has a compression of 70 or less, or 60 or less, or 50 or less, or 45 or less. The cover preferably has an overall thickness of 0.1 inches or greater. The cover optionally includes an inner cover layer and an outer cover layer, wherein the inner cover layer is formed from a highly resilient material.

In another particular embodiment, the present invention is directed to a golf ball comprising a core, a polyurethane or polyurea outer cover layer, and an intermediate layer disposed between the core and the outer cover layer. The core layer is formed from a rubber composition comprising a high level of an oily substance and has a diameter of 1.4 inches or less. Preferably, the core has a diameter within the range having a lower limit of 0.5 inches or 0.8 inches or 1.3 inches and an upper limit of 1.35 inches or 1.4 inches. The core layer preferably has a compression of 70 or less, or 60 or less, or 50 or less, or 45 or less. The intermediate layer has a thickness of 0.1 inches or greater, preferably from 0.1 inches to 0.3 inches, and is formed from a highly resilient material. Suitable highly resilient materials include the highly resilient materials disclosed above. Preferably the highly resilient material of the intermediate layer is selected from partially-neutralized acid copolymers, fully-neutralized acid copolymers, blends of two or more partially-neutralized acid copolymers, blends of two or more fully-neutralized acid copolymers, and blends of at least one partially-neutralized acid copolymer and at least one fully-neutralized acid copolymer.

In yet another particular embodiment, the present invention is directed to a golf ball comprising a 2-layer core and a 2-layer cover. The 2-layer core includes an inner core layer (i.e., center) and an outer core layer. The inner core layer is formed from a rubber composition comprising a high level of an oily substance and preferably has a diameter of 1 inch. The outer core layer comprises a rubber composition comprising a base rubber and 5 parts or less of an oily substance, by weight per 100 parts of the base rubber, and preferably has a thickness of 0.280 inches. Thus, the overall diameter of the 2-layer core is preferably 1.560 inches. The 2-layer cover includes an inner cover layer and an outer cover layer. The inner cover layer comprises an ionomer and preferably has a thickness of 0.030 inches. The outer cover layer comprises a castable polyurethane or polyurea composition and preferably has a thickness of 0.030 inches.

The present invention is not limited by any particular process for forming the golf ball layer(s). It should be understood that the layer(s) can be formed by any suitable technique, including injection molding, compression molding, casting, and reaction injection molding.

For purposes of the present invention, compression is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

For purposes of the present invention, COR is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transit time period proportional to the ball's incoming velocity. The ball impacts the steel plate and rebounds though the light screens, which again measure the time period required to transit between the light screens. This provides an outgoing transit time period proportional to the ball's outgoing velocity. COR is then calculated as the ratio of the outgoing transit time period to the incoming transit time period, $COR=T_{out}/T_{in}$.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A solid golf ball comprising a core and a cover, wherein the core is formed from a rubber composition comprising a base rubber and from 10 parts to 25 parts of an oily substance, by weight per 100 parts of the base rubber, wherein the base rubber is a polybutadiene having a Mooney viscosity of 45 or greater.

2. The solid golf ball of claim 1, wherein the polybutadiene has a Mooney viscosity of 55 or greater.

3. The solid golf ball of claim 1, wherein the polybutadiene has a Mooney viscosity of 65 or greater.

4. The solid golf ball of claim 1, wherein the polybutadiene rubber is neodymium-catalyzed polybutadiene.

5. The solid golf ball of claim 4, wherein the polybutadiene rubber has a cis content of 90% or greater.

6. The solid golf ball of claim 1, wherein the oily substance is a low PCA oil.

7. The solid golf ball of claim 1, wherein the core has a compression of 50 or less.

8. The solid golf ball of claim 1, wherein the cover has an overall thickness of 0.1 inches or greater.

9. The solid golf ball of claim 1, wherein the cover includes a layer formed from a highly resilient material selected from partially- and fully-neutralized acid copolymers and blends thereof.

* * * * *